United States Patent [19]

Festag et al.

[11] 4,409,808
[45] Oct. 18, 1983

[54] PROCESS FOR THE PRODUCTION OF BLISTERS

[75] Inventors: Werner Festag; Hans-Ueli Müller, both of Schaffhausen, Switzerland

[73] Assignee: Swiss Aluminium Ltd., Chippis, Switzerland

[21] Appl. No.: 220,815

[22] Filed: Dec. 29, 1980

Related U.S. Application Data

[63] Continuation of Ser. No. 20,216, Mar. 14, 1979, Pat. No. 4,266,416.

[30] Foreign Application Priority Data

Mar. 31, 1978 [CH] Switzerland .......................... 3460/78

[51] Int. Cl.³ .............................................. B21D 26/04
[52] U.S. Cl. .......................................... 72/60; 72/350
[58] Field of Search ................ 72/54, 56, 60, 63, 350, 72/356; 29/421 R

[56] References Cited

U.S. PATENT DOCUMENTS

| | | | |
|---|---|---|---|
| 1,625,914 | 4/1927 | Seibt | 72/54 |
| 3,572,071 | 3/1971 | Semplak | 72/54 |
| 3,623,347 | 11/1971 | Burk | 72/60 |
| 3,769,824 | 11/1973 | Granzow | 72/350 |
| 3,914,969 | 10/1975 | Banks | 72/63 |
| 4,045,986 | 9/1977 | Laycock | 72/60 |

FOREIGN PATENT DOCUMENTS

| | | | |
|---|---|---|---|
| 2321980 | 11/1974 | Fed. Rep. of Germany . | |
| 2539354 | 10/1977 | Fed. Rep. of Germany | 72/350 |
| 2017904 | 5/1970 | France | 72/60 |
| 576143 | 10/1977 | U.S.S.R. | 72/63 |

*Primary Examiner*—Gene Crosby
*Attorney, Agent, or Firm*—Bachman and LaPointe

[57] ABSTRACT

The invention concerns a process and device for the manufacture of blisters with high barrier properties using metal-plastic composite foils which can be deep drawn, in particular an aluminum-plastic composite foil which is clamped firmly in the clamping facility of a device for manufacturing blisters. The process is such that the composite foil is pre-stretched in a first step and then shaped into a blister in a second step.

13 Claims, 20 Drawing Figures

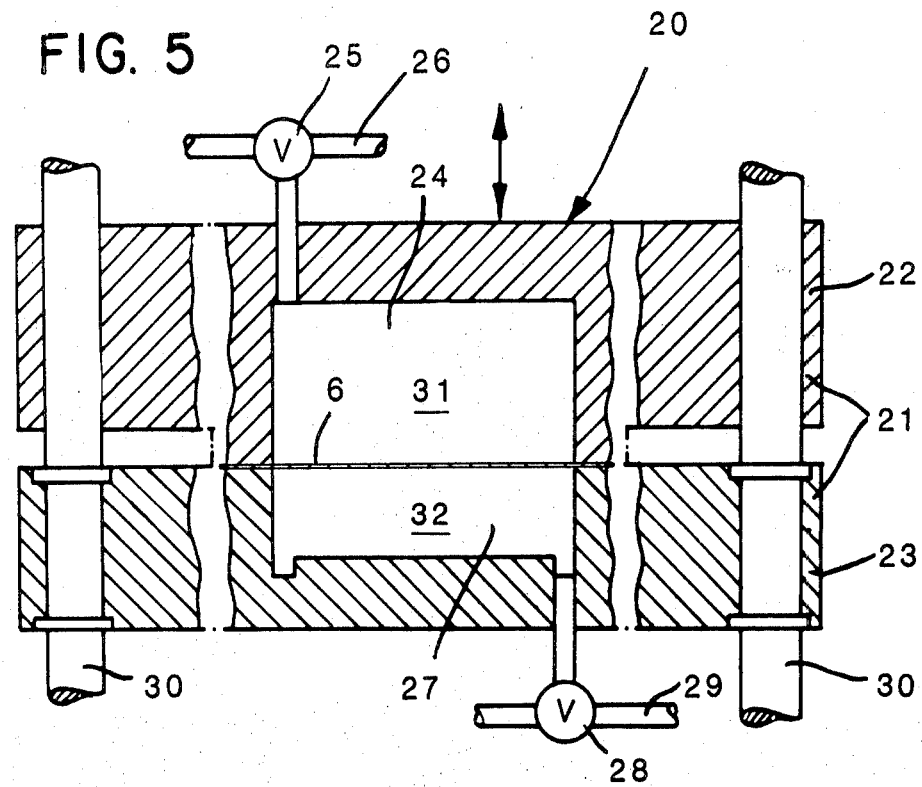
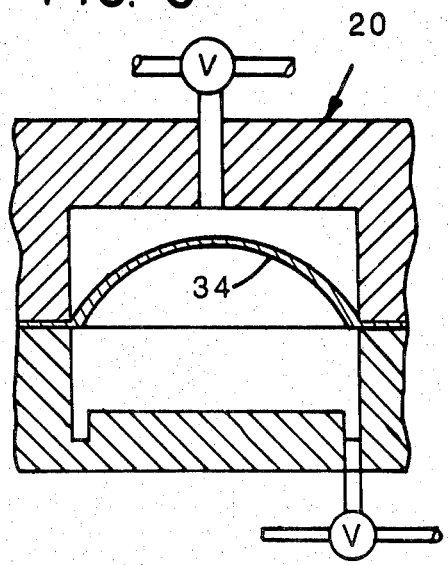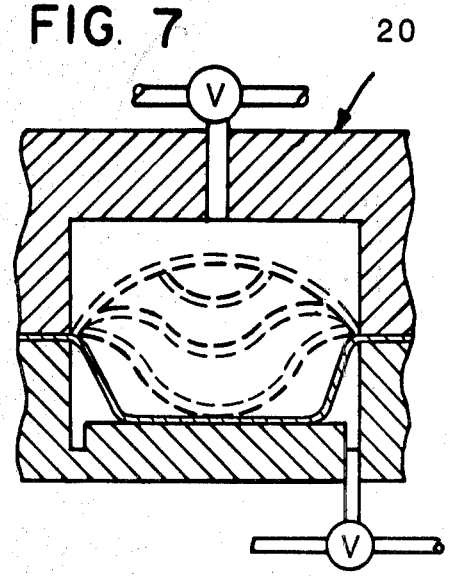

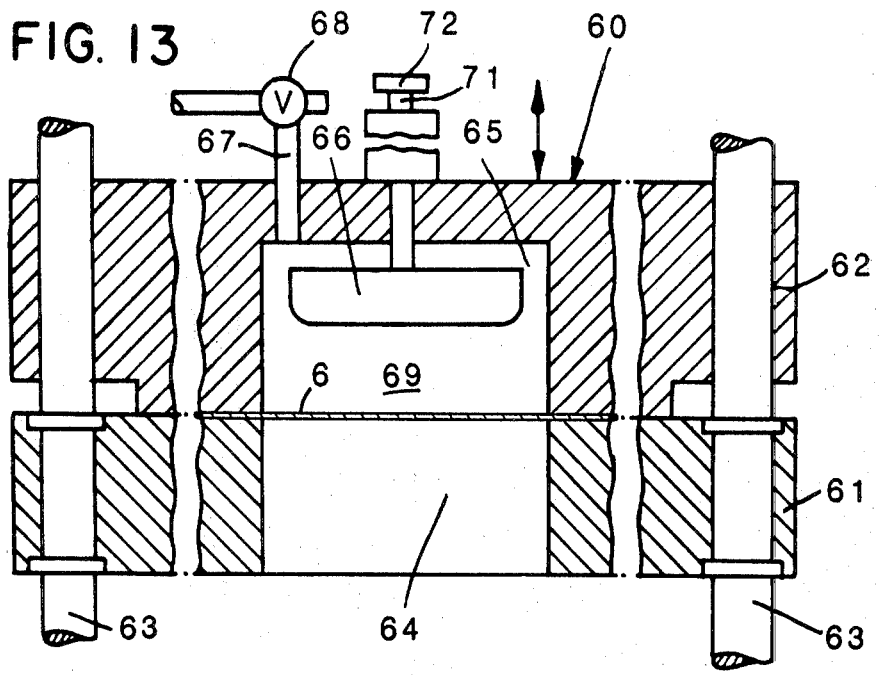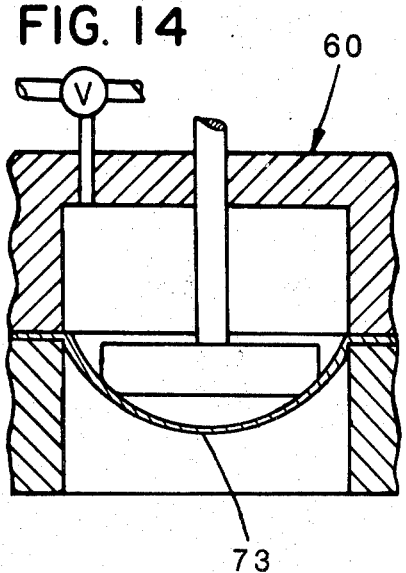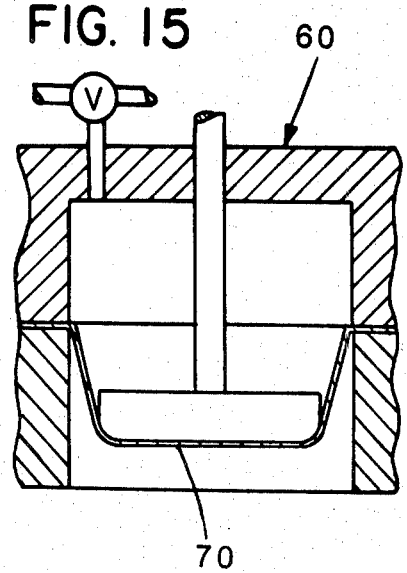

PROCESS FOR THE PRODUCTION OF BLISTERS

CROSS-REFERENCE TO RELATED APPLICATIONS

This application is a continuation of U.S. patent application Ser. No. 20,216, filed Mar. 14, 1979, now U.S. Pat. No. 4,266,416, issued May 12, 1981.

BACKGROUND OF THE INVENTION

The invention presented here concerns a process and device for manufacturing blisters which have high barrier properties using a metal-plastic composite foil, in particular an aluminum-plastic composite foil which is claimed in the clamping facility of a device for making the blisters and such that the clamped foil cannot move.

In the conventional deep drawing process used up to now it is a disadvantage that the deep drawing ratio must be made to suit the critical range of radius i.e. reduced as necessary, because of the non-uniform stressing of the metal-plastic composite foil during deep drawing.

What is known, for example from the German Pat. No. 2 231 980, it is a device for producing cup-shaped recesses in thin aluminum-plastic composite strip using the plunger of a die and a clamping facility which holds the strip firmly on the die. The shaping surface of the plunger firmly holds in place a thin layer of material which has a low coefficient of friction. The purpose behind such measures is to prevent cracks from forming in the aluminum-plastic composite during the deep drawing operation and to prevent the composite from being subjected to relatively large frictional forces during deep drawing. The frictional forces which arise during the deep drawing operation do not depend only on the coating of the plunger but also on the coefficient of friction of the metal-plastic foil. In the case of foodstuffs and pharmaceuticals, special lubricants are often not permitted on the inside of the blister. Since this is so, small changes in the surface of the metal-plastic composite foil lead to variations in deep drawability or to interruptions in production.

Furthermore, for example in the German Pat. No. 2 539 354, a process and device for manufacturing light weight containers from foils of metal, plastic or preferably from a metal-plastic composite foil are described, whereby the foil is held firmly at the edge of an opening and stretched into a cup shape in the opening by means of a plunger, and where the head of the plunger first comes to rest in the inner part of the freely spanned part of the foil, stretches this to a pre-form shape with slightly inclined sidewalls and then by advancing the stroke of the plunger one, or several edges of the shoulder of the plunger one after another, come to rest against the inclined sidewall and broaden and deepen the pre-form. This process causes the blister to have a stepped sidewall or a very large radius between sidewall and base, which is not desirable.

In deep drawing metal-plastic composites such as aluminum-plastic composites the foil or strip material, in the above mentioned known processes and devices, is heavily stressed especially in the region of the radii or in the zones of the numerous shoulder edges of the plunger between the base and the sidewall, as a result of which the deep drawing ratio cannot be increased further. Furthermore, as far as the coating of the plunger with a low friction material as in the German Pat. No. 2 321 980 is concerned, it should be pointed out that such a coating is subject to relatively large amount of wear and therefore it is not possible to have continuous, uninterrupted operation with such a plunger.

Another disadvantage of the above mentioned processes and devices for carrying them out is that the basal areas of a semi-rigid blister during deep drawing are not, or only partly, subjected to elongation or pre-stretching, and therefore up to now the frequently, relatively large basal areas of the blister were subjected only to partial stretching, and consequently only relatively small deep drawing ratios could be achieved.

The object of the invention presented here is to develop a process and device for producing blisters from a metal-plastic composite which can be deep drawn, in particular from an aluminum-plastic composite, by means of which a larger deep drawing ratio and/or radii can be achieved along with steeper sidewalls in the blisters and thus larger volume blisters than was possible up to now, whereby it is also possible to achieve better shaping or matching of the blister to the contours of the contents, and whereby the disadvantages described in connection with the previously mentioned processes and devices are avoided.

SUMMARY OF THE INVENTION

The object is solved in terms of the invention by means of a process and device for carrying out the process whereby in the said process the metal-plastic composite is pre-stretched in a first step and then shaped in a second step. The pre-stretching of the metal-plastic foil usefully takes place by the application of pressure via a gaseous or liquid medium.

In a further improvement of the process, the height of the bulge produced in the foil subjected to pressure in the pre-stretching stage can be limited by means of an adjustable stop, as a means of which the permissible pressure for pre-stetching the foil can be increased.

The pre-stretching can, as desired, be carried out in the same or opposite direction to that used in the shaping operation. It is, furthermore, possible to extend the range of pre-stretching the foil to the inner walls in the interior of a clamping plate, as a result of which a particularly large area of pre-stretched foil is obtained and is available for shaping the blister if the inner walls in a space in the interior of the clamping plate are spaced further apart than the inner walls of the die—see FIG. 16.

The shaping of the metal-plastic foil after pre-stretching takes place likewise, preferably under the application of pressure via a gaseous or liquid medium, in a shape-giving part or in a die. It is however also possible to achieve the shaping with the aid of a plunger, if the shape of blister is to be produced with particular accuracy.

Furthermore, depending on the requirements, there are various possibilities e.g. to relax the pressure after pre-stretching, to maintain the pre-stretching pressure at a constant level during the shaping or to vary it during this period, as a result of which folds are avoided and further pre-stretching can take place.

The device for carrying out the process features a clamping facility made of two separable parts in which a metal-plastic composite foil can be rigidly clamped, and also has at least one part which is used to shape the foil into a blister. The device is characterized by way of the fact that at least one part of the clamping facility features a pressure supply line for a gaseous or liquid medium, fitted with a closure and/or reduction valve and leading to a stable plate which, together with the foil held in the clamping facility, forms a closed chamber, and includes a shaping tool which is situated in and/or outside the closed chamber.

In accordance with the process used for shaping, the clamping facility of the device can consist of a clamping plate and a die or of a clamping plate and a part with an open chamber housing a base, which can be moved up and down.

If desired, a stop the height of which can be adjusted can be provided to limit the cup height during the pre-stretching of the metal-plastic foil by the gaseous or liquid medium.

The interior of the clamping plate is to particular advantage provided with a greater lateral dimension than the interior of a trough-shaped recess in the die. This is designed such that the recesses with different internal lateral dimensions are positioned so that the interior of the clamping plate are at a lateral distance from the inner walls of a trough-shaped recess in the die.

BRIEF DESCRIPTION OF THE DRAWINGS

Further advantages, features and details of the invention will now be presented via the following description of preferred embodiments which are illustrated in a simplified manner with the help of the drawings but showing only one shaping tool over the whole breadth of the device, although a plurality of shaping tools can in fact be arranged over the whole breadth of the tool, viz.

FIG. 5: A section through a second exemplified embodiment of the device showing a metal-plastic composite foil stretched between a die and a clamping plate featuring a trough-shaped recess, and showing also pipelines for supplying a pressurized medium to the die and the clamping plate.

FIG. 6: The same device as in FIG. 5, again shown in cross section, but showing the pre-stretched foil forced into the trough-shaped recess in the clamping plate by applying to it a gaseous or liquid medium under pressure.

FIG. 7: The same device as in the FIGS. 5 and 6, but showing the partly shaped foil which has been forced into a trough-shaped recess having the shape of the blister by applying to the foil a gaseous or liquid medium under pressure.

FIG. 13: A cross section through a fifth exemplified embodiment of the invention showing a clamping device, between two parts of which a metal-plastic composite foil is held, and showing too a pipeline for supplying a pressurized medium connected to a clamping plate with a trough-shaped recess, and also a plunger which is mounted on the clamping plate and can be raised or lowered into an open chamber in the other part of the clamping device.

FIG. 14: The same device as in FIG. 13, however showing a plunger lowered to the level of the pre-stretched foil.

FIG. 15: The same device as in FIGS. 13 and 14 with a plunger lowered to a position in which the foil has been shaped to the form of a blister.

DETAILED DESCRIPTION

Figure 19:
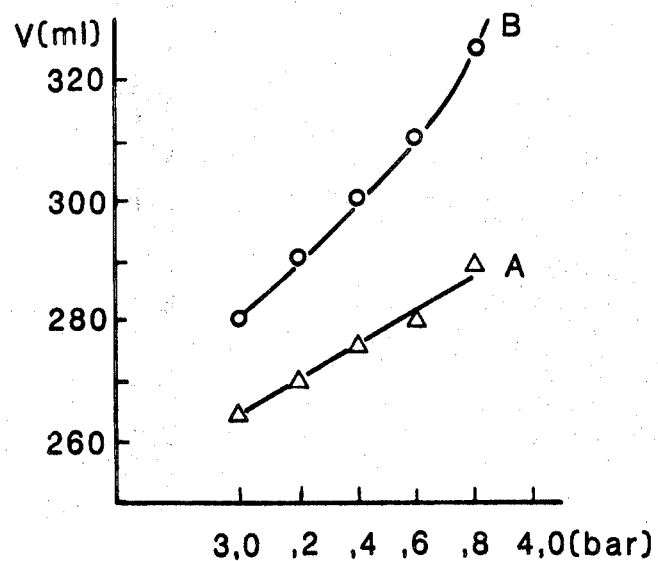
FIGS. 19 and 20 are diagrams comparing deep drawing methods known up to now with the method of the present invention showing the better deformation achieved in accordance with the present invention. Curve A shows the volume which can be obtained with conventional deep drawing, curve B the volume that can be obtained in accordance with the present invention and curve C the volume as a function of varied pre-stretching pressure.

Also, a first diagram shown as FIG. 19 shows, by way of comparison with the deep drawing methods known up to now, the advantageous possibilities of achieving better deformation of metal-plastic composite foils viz., with curve A the volume which could be attained by conventional deep drawing, and with curve B the volume that can be attained with the help of the process of the invention using the same material and the same area. The metal-plastic composite foil represented by curve B was pre-stretched at a constant pressure (1.8 bar). The diagram shows the better deformation (measured in ml) achieved with the foil pre-stretched under varied pressure, in comparison with conventional deep drawing.

Figure 20:
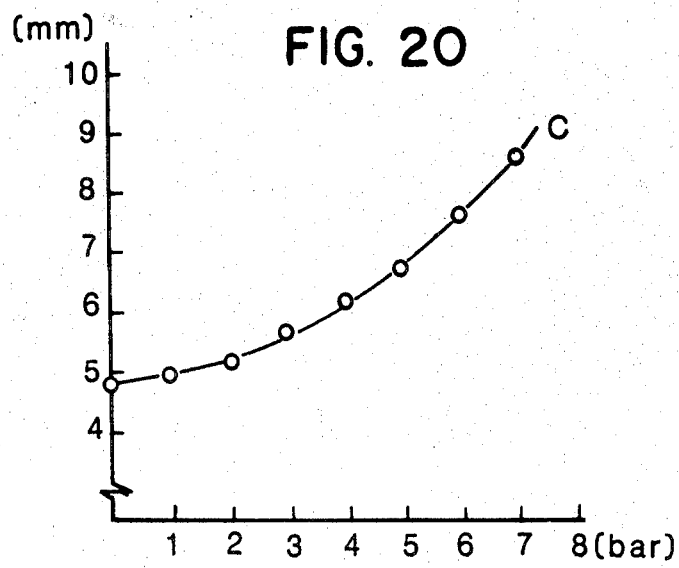

The depth (in mm) of blister which can be achieved is represented in FIG. 20 by the curve C as a function of the varied pre-stretching pressure (bar). From this it is clear that with increasing pre-stretching pressure the blister depth can be increased by up to approximately 85% without damaging the metal-plastic foil.

In the first exemplified embodiment of the invention shown in FIGS. 1-4 the device 1 features a clamping facility 2 comprising two parts 3 and 4 which can be separated from each other. One part 3 of the clamping facility 2 is provided with an open chamber 5 and is connected firmly to a frame 7. A metal-plastic foil 6 is laid on the flat surface of the part 3 which is firmly connected to the frame, and held there immovably by means of a clamping plate 4 which can be moved up and down on the frame 7 of the clamping facility 2. The clamping plate 4 features a trough-shaped recess 8 to which a pressure pipeline 10 for the supply of a gaseous or liquid medium under pressure is connected, the said pipeline 10 being fitted with a valve 9 for regulating the pressure and for closing off the pipeline 10. When the foil 6 is firmly clamped between both parts 3 and 4 of the clamping device 2 a closed chamber 11 is formed by the foil 6 and the recess 8, via which the foil 6 is put under pressure for the purpose of pre-stretching it. A base 12, which can move upwards and downwards, is provided in the open chamber 5 of the part 3 of the clamping device 2 for shaping the foil after the pre-stretching. This base 12 passes through a strut 13 which runs perpendicular to the base 12 and is connected securely to the frame 7.

In the case of the second exemplified embodiment, shown in FIGS. 5-8, the device 20 features a clamping facility 21 which is for clamping a metal-plastic composite foil, and which comprises two separable parts viz., a clamping plate 22 and a die 23.

The clamping plate 22 is provided with a trough-shaped recess 24 which is connected to a pressure pipeline 26 fitted with a closure and pressure regulating valve 25. The die 23 features a trough-shaped recess 27 the shape of which corresponds to the desired shape of the blister and which is connected to a pressure supply line 29 fitted with a closure and pressure regulating valve 28. It should also be pointed out that both parts 22 and 23 of the clamping facility 22 are connected to a frame 30 either securely and immovably or such that a backwards and forwards movement with respect to the frame 30 is possible.

By means of a foil 6 clamped firmly between both parts 22 and 23 of the clamping facility 21 a chamber 31 is formed by the trough-shaped recess 24 in the clamping plate 22 and the foil 6, and a chamber 32 by the trough-shaped recess 27 in the die 23 and the foil 6.

Figure 8:
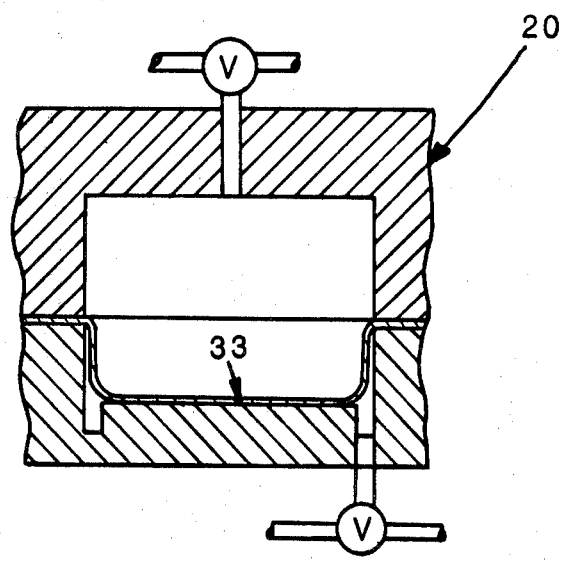
FIG. 8: The same device as in FIGS. 5, 6 and 7, again shown in cross section, however showing a foil which has been fully shaped into the form of a blister.

With reference to the pressure supply line 29 connected to the die 23 and the pressure supply line 26 connected to the clamping plate 22, special mention should be made that a gaseous or liquid medium is supplied from a pressure source not shown here and at a predetermined pressure first via pipe 29 to the chamber 32 to pre-stretch the foil, and, after the pre-stretching the pressure in chamber 32 is reduced or completely removed, and then a gaseous or liquid medium, likewise at a predetermined pressure, is supplied via pipe 26 to the chamber 31 to shape the already pre-stretched foil into a blister 33 in the trough-shaped recess 27 in the die 23 (see FIG. 8).

Figure 9:
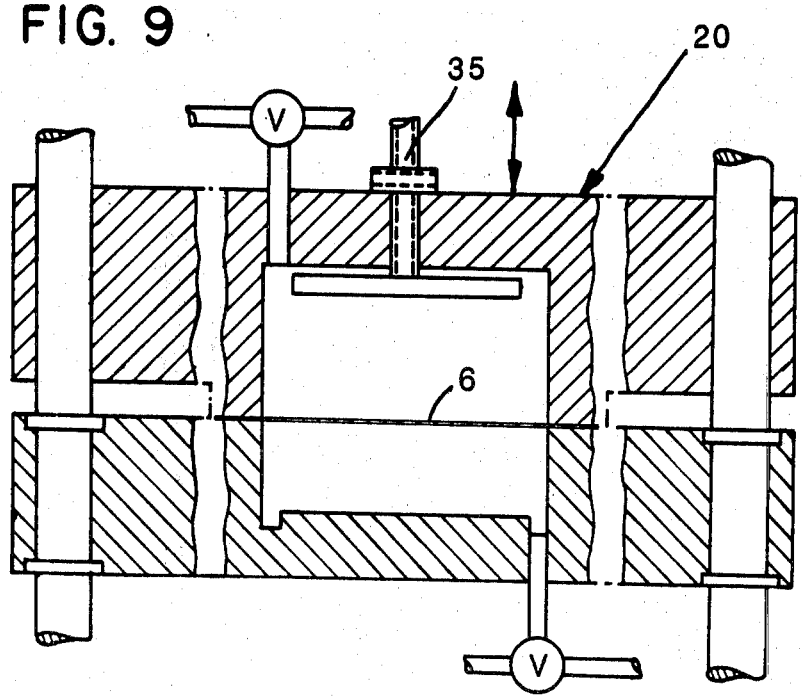
FIG. 9: A cross section through a third exemplified embodiment of the device which is constructed in the same way as the device shown in FIGS. 5 to 8, but which additionally features a stop which can be used to limit the height to which the metal-plastic foil is domed on pre-stretching.

The third exemplified embodiment, shown in FIG. 9, represents an extension to the embodiment shown in FIGS. 5-8 in that, additionally, a stop 35, which limits the height of the pre-stretched metal-plastic foil, and the height of which can be adjusted from outside, is provided in the trough-shaped recess 24 in the clamping plate 22.

Figure 10:
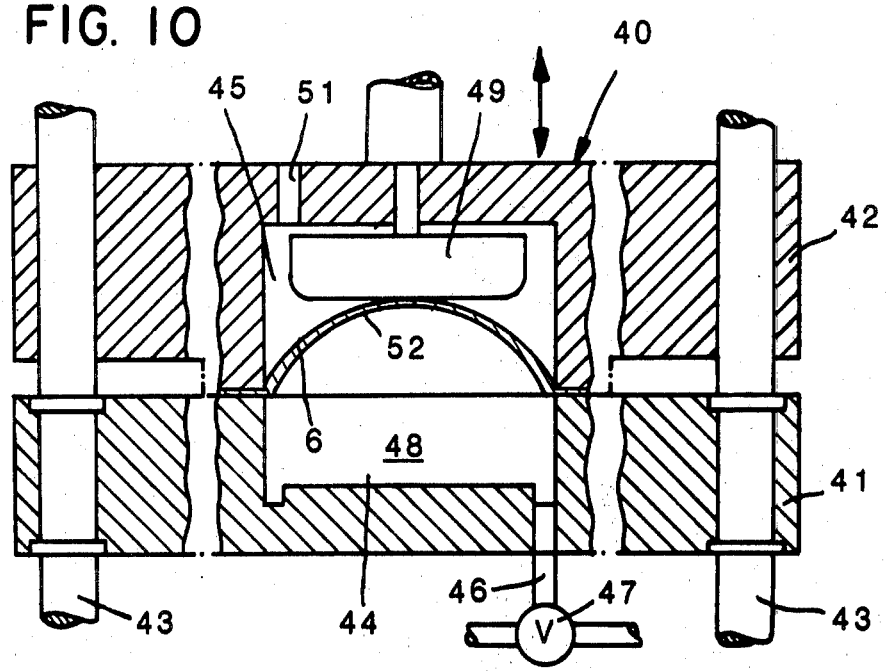
FIG. 10: A cross section through a fourth exemplified embodiment of the invention showing a metal-plastic composite foil held between a die and a clamping plate and pre-stretched into a trough-shaped recess in the clamping plate, and showing too a pipeline for supplying a gaseous or liquid medium under pressure to the die, and a plunger which can be removed forwards and backwards in trough-shaped recesses in the clamping plate and the die.
Figure 11:
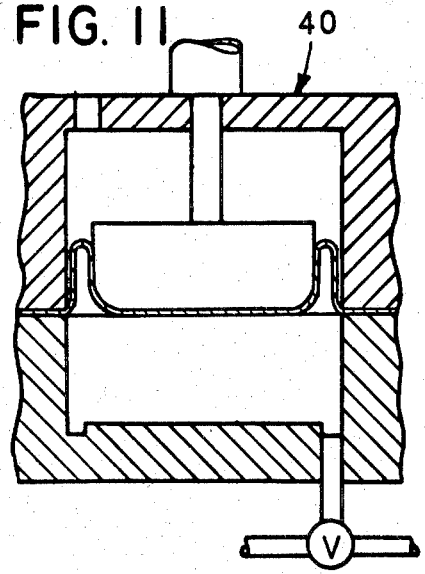
FIG. 11: A cross section through the same device as in FIG. 10 with the plunger in operation and in such a position that the foil is partly shaped into the blister form.
Figure 12:
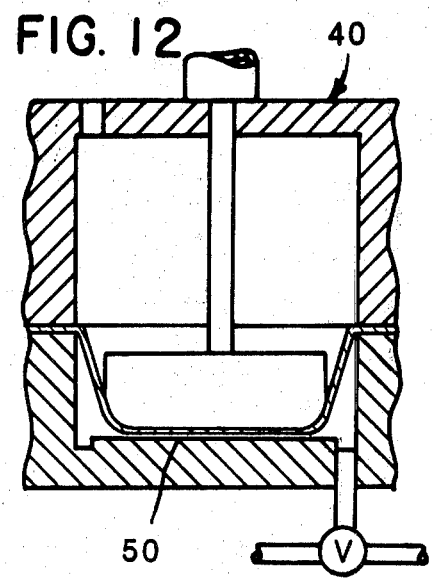
FIG. 12: A cross section through the same device as in FIG. 11 with the plunger in operation and in such a position that the foil has been shaped fully to the form of a blister.

In the case of the fourth exemplified embodiment, shown in FIGS. 10, 11 and 12, the device 40 features two parts which, as in the embodiments 1-3, can be separated from each other viz., a die 41 and a clamping plate 42 which are fixed to a frame 43 or guided by the frame 43 and between which a metal-plastic composite foil 6 is firmly held. The die 41 and the clamping plate 42 are provided with trough-shaped recesses 44 and 45. A pressure supply line 46 leading to recess 44 is connected to the die 41, the supply line 46 being fitted with a closure and pressure regulating valve 47 and being employed to pre-stretch the foil 6 by means of a gaseous or liquid medium under pressure, whereby it should be mentioned in particular that, by clamping the foil between the die 41 and the clamping plate 42, a closed chamber 48 is formed by the foil 6 and a trough-shaped recess 44 in the die 41.

Provided in the trough-shaped recess 45 in the clamping plate 42 is a plunger 49 which can be moved up and down and by means of which the already stretched foil 6 is shaped into the form of a blister 50 in the correspondingly shaped recess 44 in the die 41. It should also be pointed out that a hole 51 in the clamping plate 42 leading to the recess 45 is provided, and through which the air can escape from the recess 45 in the clamping plate 42 during the pre-stretching of the foil 6.

In the fifth exemplified embodiment, shown in FIGS. 13, 14 and 15, the device 60 features, in the same manner as the first exemplified embodiment (FIGS. 1-4), separable parts 61 and 62, which are fixed or guided by a frame 63, and between which a metal-plastic composite foil 6 can be immovably held. Part 61 has an open chamber 64 and part 62, the clamping plate, has a trough-shaped recess 65 positioned over the open chamber 64 of part 61 in which a plunger 66, which can be moved up and down, is provided. A pressure supply line 67 fitted with a closure and regulating valve 68 is connected up to the upper clamping plate 62. A gaseous or liquid medium is introduced under pressure via this pipe 67 into a recess 69 formed by the recess 65 in the clamping plate 62 and the foil 6 to pre-stretch the foil. The plunger 66 shapes the foil 6 into a blister form, however, in order to ensure that the same amount of deformation takes place when forming each blister, a stop 72 is provided at a predetermined position on a rod 71 affixed to the plunger 66 and passing through the clamping plate 62.

Figure 16:
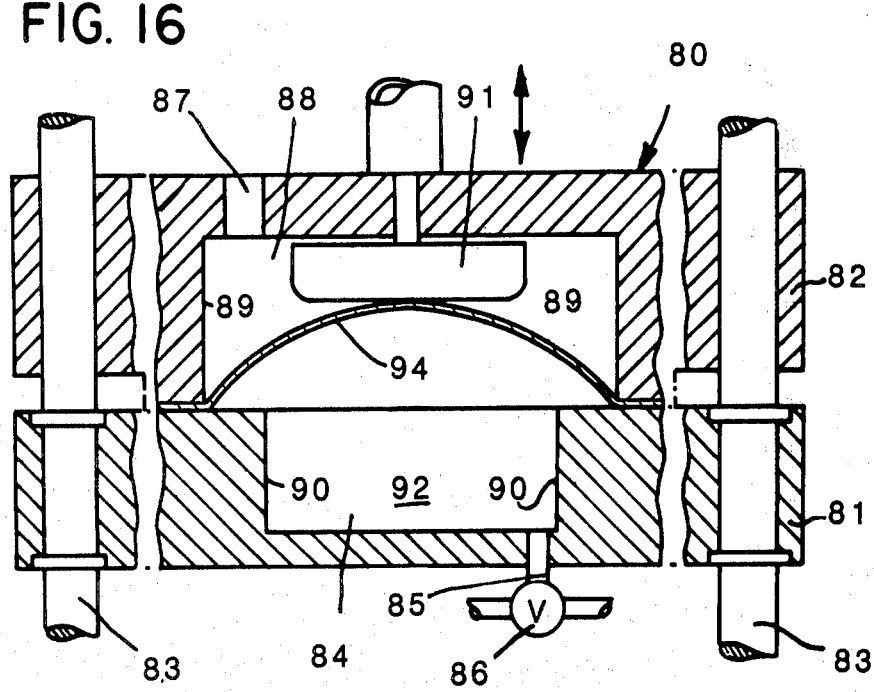
FIG. 16: A section through a sixth exemplified embodiment of the device showing a metal-plastic composite foil firmly held between a die and a clamping plate and pre-stretched by application, from the die plate side, of a gaseous or liquid medium under pressure, and showing too a plunger which is mounted on the clamping plate and can move back and forwards into the die, and also that the clamping of the foil is set back with respect to the die or the recess in the die.
Figure 17:
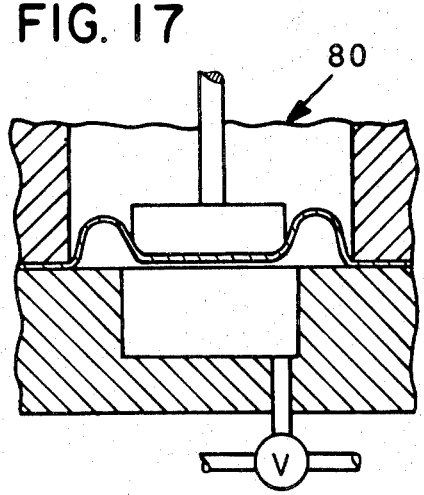
FIG. 17: The same device as in FIG. 16, again shown in cross section, but with the plunger partly lowered, pushing down the pre-stretched foil.
Figure 18:
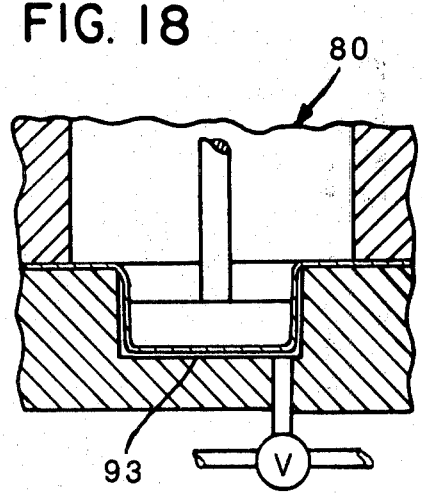
FIG. 18: The same device as in FIGS. 16 and 17, shown in cross section, but with the plunger in the fully lowered position in which the foil has been shaped to the form of a blister.

In the sixth exemplified embodiment, shown in FIGS. 16, 17 and 18 the device 80 features two separable parts viz., a die 81 and a clamping plate 82 which are fixed to or guided by a frame 83, and between which a metal-plastic composite foil 6 is firmly clamped. The die 81 features a trough-shaped recess 84 and a pressure supply pipe 85 which leads to the recess and is fitted with a closure and pressure regulating valve 86. The clamping plate 82 on the other hand is provided with a chamber 88 which opens to the exterior via a hole 87 at the top and which has greater lateral dimensions than the trough-shaped recess 84 in the die 81. The recess 88 in the clamping plate 82 is positioned with respect to the trough-shaped recess 84 in the die 81 such that the walls 89 of the recess 88 in the clamping plate 82 are at a lateral distance from the walls 90 of the recess 84 in the die 81. Further, a plunger 91 is provided, and can be lowered into the die 81 with the aid of a raising and lowering mechanism which is not shown here. The pressure supply line 85 is used here to pre-stretch the foil 6 by applying a gaseous or liquid medium at positive pressure to the foil; the plunger 91 on the other hand is used to shape the foil 6 in the trough-shaped recess 84 in the die 81. It should also be mentioned that a closed chamber 92 is formed by the clamped foil and the recess 84 in the die 81.

The modes of operation of the devices in the above mentioned six exemplified embodiments for the production of blisters from a metal-plastic composite are as follows.

It should be pointed out first that, usefully, and with only little modification to the machines already available, blisters can be manufactured from metal-plastic foils in accordance with the process of the invention. In a preferred mode of operation a plurality of blisters are produced simultaneously over the whole width of a strip of foil by appropriate arrangement of the individual shaping components. It is also possible, however, to make the blisters out of individual pieces of metal-plastic composite foil which has been cut or stamped out, if this is desired.

In all of the above mentioned six exemplified embodiments the foil is first clamped immovably between two parts of a clamping facility of the device and pre-stretched in a first step, after which the pre-stretched foil is shaped into a blister in a second step.

Figure 1:
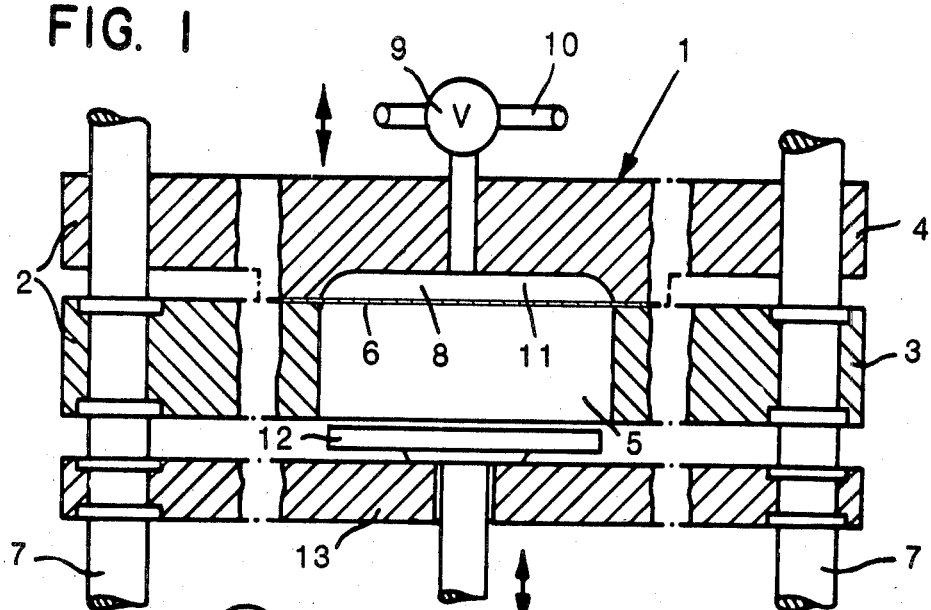
FIG. 1: A cross section through a first exemplified embodiment of the device, showing a clamping facility, between two parts of which is clamped firmly a metal-plastic composite foil, and showing a clamping plate connected to a pressure feed line, and a base which can be raised and lowered and can be dropped down into an open chamber in the other part of the clamping facility.
Figures 2, 3:
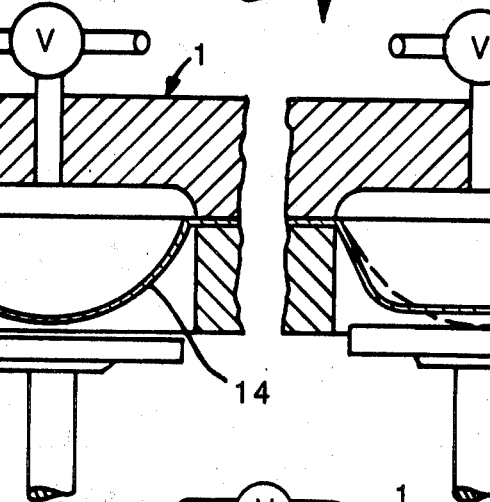
FIG. 2: A cross section through the device shown in FIG. 1, but showing a foil which has been pre-stretched by the application of pressure via a gaseous or liquid medium.
FIG. 3: A cross section through the device shown in FIG. 1 with a base slightly raised towards the pre-stretched foil to form the blister.
Figure 4:
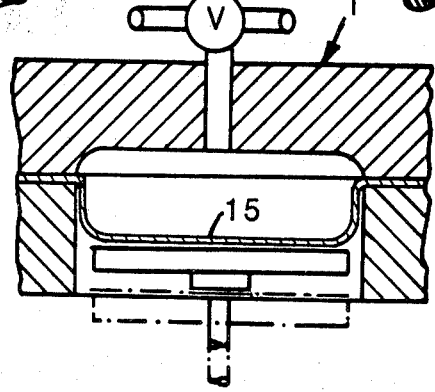
FIG. 4: The same device as in FIG. 1, again shown in cross section, but with the base raised to its end position in which the blister is completely formed.

In the first exemplified embodiments, FIG. 1-4, the pre-stretching of the foil 6 is brought about by the application of a gaseous or liquid medium at a predetermined, variable pressure supplied to a chamber 11 formed by the firmly clamped foil 6 and the trough-shaped recess 8 in the clamping plate 4 via the valve 9 which is fitted to the supply line 10 and is open in the direction of the chamber. Under the application of the pressure the foil 6 takes on the form of a dome 14 of a certain volume (see FIG. 2). Next, the base 12, as shown in FIGS. 3 and 4, is brought into a position which corresponds to the desired depth of the fully shaped blister. With the raising of the base 12, the pressure in the chamber can at the same time be raised to obtain a further elongation of the foil 6 in the region of the sidewalls of the blister 15.

In the second exemplified embodiment, FIGS. 5-8, the metal-plastic foil 6 clamped firmly between the die and the clamping plate 22 is acted on pneumatically or hydraulically by a pressure at a predetermined level supplied via the pipe 29 to the chamber 32 in the die 23 to pre-stretch the said foil 6, as a result of which the foil 6 bulges into a dome-shaped form 34 which fills out into the recess 24 in the clamping plate 22, the depth of the recess 24 corresponding to the height of the dome formed by the pre-stretched foil. After the desired degree of pre-stretching of the foil 6, see FIG. 6, the pressure in the pressure supply line 29 to the die 23 is removed or reduced by means of the valve 28, and pneumatic or hydraulic pressure applied to the foil 6 via the pipeline 26 on the clamping plate 22 connected to the chamber 31. As a result the pre-stretched foil 6 lies against the walls of the trough-shaped recess 27 in the die 23, the contour of which corresponds to the desired shape of the blister 33.

The mode of operation of the third exemplified embodiment (in FIG. 9) is similar to that of the second exemplified embodiment. The only difference is the use of the stop 35 the height of which can be adjusted and which limits the height of the domed foil to a predetermined height. The use of this stop prevents the metal-plastic composite foil 6 from being stretched too far, which experience shows occurs mainly in the upper part of the domed foil.

In the fourth example, FIGS. 10, 11 and 12, pressure is applied either pneumatically or hydraulically to the metal-plastic composite foil 6, to pre-stretch it, by applying a predetermined pressure via chamber 48 which is connected via pipe 46 to a source of compressed medium not shown here. As a result, the pre-stretched foil 6 adopts a domed shape 52 which projects into the recess 45 in the clamping plate 42.

To shape the foil into a blister 50 the plunger 49 is lowered into the recess 44 in the die 41 which creates the final form of the blister 50. During the shaping process it is useful to keep the pressure in the chamber constant or to increase it, in order to prevent uncontrolled folding of the foil 6 and to achieve an additional pre-stretching at the peripheral region of the foil 6.

In the fifth example, FIGS. 13, 14 and 15, pressure is applied pneumatically or hydraulically to the metal-plastic foil 6 which is held firmly between the clamping plate 62 and the part 61, to pre-stretch the foil 6 by applying a predetermined pressure via chamber 69 which is connected via a pipeline 67 to a source of compressed medium not shown here. As a result the pre-stretched foil 6 adopts a domed shape 73 which projects into the space 64 in the part 61.

To shape the blister 70, after pre-stretching the foil, the plunger 66 is lowered until stopped by the stop 72 on the plunger rod 71; the foil 6 is thus shaped into the form given by the head of the plunger 66.

In the case of the sixth example, FIGS. 16-18, pressure is applied pneumatically or hydraulically to the metal-plastic foil 6 held fast between the die 81 and the clamping plate 82 to pre-stretch the foil 6 by applying a predetermined pressure via the chamber 92 in the die which is connected via the pipeline 85 to a source of compressed liquid or gaseous medium not shown here. In carrying out this operation a particularly large degree of pre-stretching of the foil 6 is achieved or exploited as the clamping of the foil with respect to the die 81 or the recess 84 is set back somewhat. In the course of the pre-stretching the foil 6 stretches into a domed shape 94 out from the recess 84 in the die 81.

To create the blister 93, the plunger 91 is lowered into the trough-shaped recess 84 in the die, whereby the dome-shaped foil is first inverted and then pushed into the recess 84 where it is shaped into the form of a blister. Also, here it is useful to keep the pre-stretching pressure in chamber 92 constant or even to increase it, at least until the plunger has reached the position shown in FIG. 17. The pressure in the chamber 92 must be released however at least when the plunger 91 has reached the position shown in FIG. 18.

The invention is not limited to the exemplified embodiments presented here. Other embodiments of the invention are conceivable though not shown here.

It is possible, and to advantage, to use the process of the invention to attain a more favorable deep drawing ratio with one and the same metal-plastic composite foil i.e. greater blister depth and smaller blister radii and therefore a larger volume than previously was the case.

In the shaping of blisters the process of the invention is not limited to particular plunger contours. The pre-stretched metal-plastic foil can be shaped to a blister form which fits closely to the shape of the contents and therefore gives rise to no dead space in the package.

The devices for carrying out the process are capable of exploiting fully the maximum deep drawing properties of the composite foil, and able therefore to achieve a deep drawing ratio which is particularly suitable for the production of blister packs with high barrier properties. This is so because cracks and tears in the composite foil are avoided using the process of the invention and the device for carrying out this process, and consequently the contents can be kept or stored for long times.

What is claimed is:

1. Process for the manufacture of blisters which have high barrier properties using a metal-plastic composite foil which can be deep drawn, in particular an aluminum-plastic composite foil, which comprises fixedly and immovably holding said foil in a clamping facility having at least two separable parts and a closed chamber therein and a pipeline communicating with said closed chamber, wherein the closed chamber is formed together with the foil immovably held in the clamping facility, pre-stretching said foil to form a pendant bubble in a first step by applying pressure to the foil via a fluid medium from said pipeline to said closed chamber, and then shaping said foil into the blister form in a second step including a shaping means operatively associated with said foil for shaping said foil, thereby obtaining improved blister depth in the finally shaped product, wherein the clamping facility has a second chamber opposed to said chamber and wherein the pre-stretching is carried out in the direction counter to that experienced by the foil in the final shaping.

2. A process according to claim 1 including a stop in said clamping facility, wherein said pre-stretching step forms a dome in said foil, the height of which is limited by means of said stop.

3. A process according to claim 1 wherein said chamber includes inner walls and wherein the range over which the pre-stretching of the foil takes place extends to said inner walls.

4. A process according to claim 1 wherein the shaping of the foil into blisters takes place in a shaping die under the application of pressure by means of said medium.

5. A process according to claim 1 including a plunger in said chamber and wherein the shaping of the foil into blisters takes place with the aid of said plunger.

6. A process according to claim 1 wherein the pressure applied for the pre-stretching is relaxed completely after the pre-stretching step.

7. A process according to claim 1 wherein the pressure applied for pre-stretching is maintained at the same level after pre-stretching and during final shaping.

8. A process according to claim 1 wherein said clamping facility includes two chambers, and wherein said foil is fixedly held therebetween.

9. A process according to claim 1 wherein after the pre-stretching, a varied stretching pressure is applied during the shaping operation.

10. A process according to claim 8 wherein said foil is pre-stretched into a first of said chambers and is shaped into said blister in a second of said chambers.

11. A process according to claim 1 wherein said foil is pre-stretched and initially formed solely by means of said medium.

12. A process according to claim 1 wherein a smaller blister radii is obtained in said metal-plastic composite without cracks or tears therein.

13. Process for the manufacture of blisters which have high barrier properties using a metal-plastic composite foil which can be deep drawn, in particular an aluminum-plastic composite foil, which comprises fixedly and immovably holding said foil in a clamping facility having two closed chambers therein, wherein the closed chambers are formed together with the foil immovably held in the clamping facility, pre-stretching said foil to form a pendant bubble in a first step by applying pressure to the foil via a fluid medium from one of said closed chambers, and then shaping said foil in a second step including a shaping means into the blister form, wherein said foil is pre-stretched into a first of said chambers and is shaped into said blister in a second of said chambers, and wherein a large area for said pre-stretching is provided by providing that the lateral dimension of said first chamber is larger than the lateral dimension of said second chamber, thereby obtaining improved blister depth.

* * * * *